United States Patent Office 3,644,490
Patented Feb. 22, 1972

3,644,490
PREPARATION OF LOW MOLECULAR WEIGHT MONO- AND POLYISOCYANATES CONTAINING TERTIARY AMINO GROUPS
Hans-Georg Schmelzer, Cologne-Stammheim, Gunter Gertel, Cologne-Flittard, Eberhart Degener, Leverkusen, and Manfred Dahm, Bergisch-Neukirchen, Germany, assignors to Farbenfabriken Bayer Aktiengesellschaft, Leverkusen, Germany
No Drawing. Filed Mar. 20, 1968, Ser. No. 714,446
Claims priority, application Germany, Mar. 29, 1967, F 51,966
Int. Cl. C07c 119/04, 125/06
U.S. Cl. 260—482 B                         5 Claims

ABSTRACT OF THE DISCLOSURE

A process for the preparation of non-volatile, low molecular weight mono- and polyisocyanates containing tertiary amino groups, which is characterized in that tertiary amines which contain one or more hydroxyl groups and/or one or more secondary amino groups and/or one to three primary amino groups are reacted in known manner with an excess of an aliphatic, cycloaliphatic or aralphatic diisocyanate, at least three mols of diisocyanate being used for one of these groups which react with isocyanates, and the excess diisocyanate is completely removed by continuous flow distillation and/or thin layer distillation under reduced pressure at temperatures of 80 to 200° C.

This invention relates to a process for the preparation of organic polyisocyanates and more particularly to a process for the preparation of polyisocyanates which are relatively non-volatile and contain free —NCO groups.

The preparation of an aliphatic monoisocyanate containing a tertiary amino group from a corresponding trisubstituted urea by a thermal exchange reaction with a higher boiling isocyanate is already known (Angew. Chem. 72, 1002, 1960). This volatile aliphatic isocyanate containing a tertiary amino group is characterized as a compound which tends to self polymerization due to its basic character and is therefore only very short lived.

Organic isocyanates which contain tertiary amino groups may also be prepared inter alia in accordance with U.S. Pat. 3,345,394 by thermolysis on the nitrogen of suitably substituted thiocarbamic acid S-alkyl esters. However, the yields of the aliphatic monoisocyanates containing tertiary amino groups described there are only low. In addition, owing to their relatively high vapor pressure, these compounds cannot be accepted as physiologically harmless for use on a technical scale.

The preparation of higher molecular weight polyisocyanates containing tertiary amino groups by reacting diisocyanates with aminopolyalcohols containing tertiary nitrogen is also known from U.S. Pat. No. 2,855,421. It is clear from the NCO/OH ratio indicated therein, however, which lies between 1 and 2, that the products obtained by this process are predominantly of a higher molecular weight nature due to chain lengthening reactions.

In U.S. patent specification 2,968,672, polyisocyanates which contain a tertiary amino group are described which are prepared by reacting tetra-(2-hydroxypropyl)-alkylene diamines with diisocyanates in a molar ratio of isocyanate to hydroxyl groups of between 1.81 and 6.24. The amount of low molecular weight polyisocyanates with tertiary amino groups contained in the corresponding reaction mixtures increases with increasing NCO/OH ratio. At the same time, however, the quantity of unreacted diisocyanate also increases considerably in the reaction mixtures, so that if used for large scale techincal processes, the products have a very unpleasant odor and are not physiologically harmless. In addition, the chemical and physical properties of these polyisocyanate-diisocyanate mixtures become modified with increasing diisocyanate content in a manner which is undesirable if they are to be used as low molecular weight polyisocyanates. In the same patent specification, it is also pointed out that the temperature of the reaction mixtures must be kept below 75° C. in order to avoid side reactions.

The removal of unreacted diisocyanates by continuous flow distillation and/or thin layer distillation from the reaction products of low molecular weight, monohydric or polyhydric alcohols with an excess of diisocyanate also belongs to the state of the art (U.S. patent specification 3,183,112). In this process, although the products are heated only for a short time to elevated temperatures and not subjected to thermal stress for prolonged periods in a distillation sump, the temperatures employed in practice for complete removal of the diisocyanate lie considerably above 75° C., a temperature which according to U.S. patent specification 2,968,672 must not be exceeded if the formation of side reactions by the polyisocyanates containing tertiary amino groups is to be avoided.

From U.S. patent specification 2,954,365 it is known that relatively brief heating of aromatic and aliphatic mono- and/or polyisocyanates in the presence of tertiary amines and carbamic acid esters, e.g. urethanes from N,N-dialkylaminoethanol derivatives and N-alkyldiethanol derivatives leads to polymerization of these isocyanates.

It is therefore an object of this invention to provide an improved process for obtaining relatively non-volatile low molecular weight isocyanates containing tertiary amino groups. Another object of this invention is to provide an improved process for the preparation of tertiary amine containing organic isocyanate, alcohol or amine adducts which are substantially free of monomeric organic isocyanates. A further object of this invention is to provide an improved process for the production of substantially monomer free isocyanate adducts while avoiding the formation of undesirable by-products.

The foregoing objects and others which will become apparent from the following description are accomplished in accordance with the invention, generally speaking, by providing a process for the preparation of non-volatile, low molecular weight organic isocyanate containing tertiary amino groups which comprises reacting a tertiary amine which contains one or more hydroxyl groups, one or more secondary amino groups or one to three primary amino groups with an excess of an aliphatic, cycloaliphatic or aralphatic diisocyanate, at least three mols of diisocyanate being used for each mol of hydrogen that is reactive with a —NCO group and the excess diisocyanate is substantially completely removed under diminished pressure by means of continuous flow distillation or thin layer distillation at temperatures of about 80 to about 200° C. It was definitely surprising that excess diisocyanate could be removed according to the invention from mono- and polyisocyanates containing tertiary amino groups and urethane groups at temperatures of 80 to 200° C., preferably 100 to 160° C., by thin layer distillation under reduced pressure without polymerization occurring to any significant extent. The present invention thus enables the technically interesting non-volatile low molecular weight mono- and polyisocyanates containing tertiary amino groups to be produced as pure individual compounds.

Suitable starting materials for the process of the invention are any tertiary amines which contain one or more hydroxyl groups and/or one or more secondary amino groups and/or 1 to 3 primary amino groups. Especially suitable are tertiary aliphatic amines such as N,N-dimethylaminoethanol-(2);
N,N-diethylaminoethanol-(2);
N,N-di-n-butylaminoethanol-(2);
N-methyl-di-(2-hydroxyethylamine);
N-ethyl-di-(2-hydroxyethylamine);
tri-(2-hydroxyethyl)-amine;
N,N-dimethylaminopropanol-(2);
N,N-diethylaminopropanol-(2);
N-methyl-di-(2-hydroxypropyl)-amine;
tri-(2-hydroxypropyl)-amine;
N,N,N',N'-tetra-(2-hydroxypropyl)-ethylene diamine;
N,N,N',N'-tetra-(2-hydroxypropyl)-hexamethylene-diamine;
N-(2-hydroxyethyl)-morpholine;
N-(2-hydroxyethyl)-(2-dimethylsila)-morpholine;
N-(2-hydroxyethyl)-piperazine;
N-methylpiperazine;
N,N-dimethyl-1,3-diaminopropane;
N,N-diethyl-1,3-diaminopropane;
N,N'-di-(3-aminopropyl)-piperazine;
N-methyl-di-(3-aminopropyl)-amine and the like. The tertiary amine preferably contains 1 to 4 hydroxyl groups.

The following are examples of aliphatic, cycloaliphatic or araliphatic diisocyanates suitable for the process: tetramethylene diisocyanate; hexamethylene diisocyanate; decamethylene diisocyanate; 1,3 - di-(3-isocyanatopropoxy)-2,2-dimethylpropane; cyclohexane diisocyanate - (1,4); methylcyclohexane diisocyanate-(2,4); methylcyclohexane diisocyanate-(2,6); mixtures of methyl cyclohexane diisocyanate-(2,4) and methylcyclohexane diisocynate-(2,6); dicyclohexylmethane-4,4'-diisocyanate; 1-isocyanato-3-isocyanatomethyl-3,5,5-trimethylcyclohexane; 1,2-di-(isocyanatomethyl)-cyclobutane; m-xylylene diisocyanate, p-xylylene diisocyanate and the like.

The tertiary amines are preferably reacted with the diisocynates at temperatures of 20 to 120° C., preferably 50 to 100° C., in such a manner that an excess of diisocyanate is always present. On a laboratory scale, for example, the tertiary amines, which are very largely liquid or low melting, are added dropwise, with stirring, to the diisocynate which may if desired be preheated, and the temperature of the reaction mixture is maintained at the desired level by adjusting the rate at which the drops are added. In this operation, at least 3 mols of diisocyanate should be used for every group of the tertiary amine that reacts with isocyanates, i.e. at least 3 mols of diisocyanate are preferably present for each mol of active hydrogen in the active hydrogen compound. Preferably, 4 to 8 mols of diisocyanate are used per mol of hydroxyl or amino group. In the case of tertiary amines which contain hydroxyl groups and/or secondary amino groups, the number of isocyanate groups in the reaction products with diisocyanates is generally equal to the number of hydroxyl and/or secondary amino groups in the starting material. Primary amino groups react with the diisocyanates in the first stage to form a urea to which another molecule of diisocyanate is added in the second stage to form a biuret derivative. The reaction product thus as a rule contains two isocyanate groups for each primary amino group in the tertiary amine. The reaction mixtures can generally be subjected to thin layer distillation immediately after the reaction. It is advisable, however, especially in the case of systems that contain biuret groups, to treat the reaction mixture for some time at elevated temperature.

For the continuous removal of excess diisocyanate by distillation, which is carried out at 80 to 200° C., preferably 100 to 160° C., under diminished pressure, preferably at 0.05 to 50 mm. Hg, conventional flow evaporators and/or thin layer evaporators are used, the mode of operation of which has been described e.g. in U.S. patent specification 3,183,112. For thin layer distillation on a laboratory scale, for example, a glass apparatus in which the reaction mixture which is to be distilled runs as a thin film down the wall of a vertical, externally heated tube in a vacuum produced by a water jet or oil pump is preferably used. The excess diisocyanate distills off over a descending cooler arranged in the upper part of the tube, and the relatively non-volatile mono- or polyisocyanate which contains tertiary amino groups is collected in a receiver situated at the lower end of the tube. In order continuously to produce a thin film on the wall of the tube, a wiper stirrer centrally placed in the longitudinal direction of the tube is rotated to project the distillation material against the wall of the tube and to produce, as a result of the relatively small distance between the wiper-blade of the stirrer and the wall of the tube, a constantly renewed thin film of substance. The thin layer distillation may be repeated several times until the resulting mono- or polyisocyanate which contains tertiary amino groups is practically free from monomeric diisocyanate. The amount of monomeric diisocyanate in the products of the process thus does not exceed the limit of physiological safety, which is generally in the region of 0.5% of monomeric diisocyanate. The yields are practically quantitative.

The mono- and polyisocyanates produced according to the invention are practically free from polymerization products. This is extremely surprising, not only in view of the thermal stress to which the products are subjected but also in view of the large amount present in the reaction mixtures of tertiary amines and co-catalysts such as urethane groups which are known from U.S. patent specification 2,954,365 to be highly active for the polymerization of diisocyanates.

If stored with exclusion of moisture, the products of the process remain in a condition suitable for practical use for a sufficient length of time or even indefinitely, depending on the degree of purity of the starting materials.

The low molecular weight aliphatic mono- and polyisocyanates containing tertiary amino groups prepared according to the invention are practically odorless. Owing to their low vapor pressure, no risk is involved of inhaling these products under normal conditions.

The products of the process are very fluid to moderately viscous liquids which have optimum solubility and properties for working up. Due to the catalytic action of the tertiary amino groups, the products of the process represent extremely reactive aliphatic isocyanates which in many cases exceed the reactivity of the generally highly reactive aromatic isocyanates.

The low molecular weight mono- and polyisocyanates containing tertiary amino groups prepared according to the invention are particularly suitable, e.g. as amine catalysts, which are capable of being incorporated for the production of polyurethane foams. Tertiary amines hitherto generally used in practice as catalysts gradually diffuse out of the finished polyurethane foam, thus causing an unpleasant odor. The tertiary amines obtained according to the invention, on the other hand, are incorporated via the isocyanate groups into the polyurethanes from which the foam is synthesized, so that they can no longer escape from the finished foam. The finished foams are useful as cushions or for installation in the walls of dwellings or the like.

The invention is further illustrated by the following examples in which parts are by weight unless otherwise specified.

EXAMPLE 1

About 178 g. (2 mol) of N,N-dimethylaminoethanol-(2) are added drop by drop at such a rate, with concomitant stirring, to about 1680 g. (10 mol) of hexamethylene diisocyanate-(1,6) heated to about 90° C. so that the temperature of the reaction mixture is kept at about 90° C. The reaction mixture is then stirred for a further 4 hours at about 90° C., and excess hexamethylene diisocyanate is removed by means of a thin layer evaporator by heating at a temperature of about 150° C. in a vacuum of about 0.1 to 0.2 mm. Hg. The highly fluid, pale yellow reaction product is found according to the analytical data to have the following constitution:

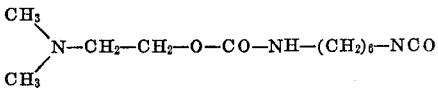

The yield is practically quantitative.

Use of the diisocyanate of Example 1 for the production of polyurethane foams:

1.5 parts of the isocyanate prepared according to Example 1 are intimately mixed with the following components:

100 parts of a slightly branched polypropylene glycol modified with terminal ethylene oxide groups (OH number 46, molecular weight 3500)
0.2 part of tin(II)-octoate
1.25 parts of a water-soluble polyether siloxane
4.5 parts of water and
51 parts of toluylene diisocyanate (80% 2,4- and 20% 2,6-isomer).

About 15 seconds after the components have been mixed, the mixture becomes cloudy and a foam starts to develop, expansion being complete after about 60 seconds. The foam has good physical properties.

In another embodiment, about 12.5 parts of the isocyanate of Example 1 is reacted with the following components:

100 parts of a slightly branched polyester which has been obtained by condensation of adipic acid with diethylene glycol and a small quantity of trimethylolpropane (OH number 60, molecular weight 2500),
1.0 part of ethoxylated hydroxydiphenyl dervatives,
3.0 parts of sodium-castor oil sulphonate (water content 50%),
3.0 parts of water,
54 parts of toluylene diisocyanate (65% 2,4- and 35% 2,6-isomer).

About 10 seconds after the above products have been mixed, foam formation begins, cloudiness setting in at the same time, and is completed after about 55 seconds. The foams obtained have good mechanical properties.

EXAMPLE 2

The reaction mixture prepared according to Example 1 from about 1680 g. (10 mols) of hexamethylene diisocyanate-(1,6) and about 346 g. (2 mol) of N,N-di-n-butylaminoethanol-(2) is subjected to thin layer distillation at a heating temperature of about 130° C. at about 0.2 mm. Hg.

About 671 g. (98.4% of the theoretical) of a pale yellow, highly fluid product are obtained which has an amino equivalent of about 345 (calculated 341) and an NCO content of about 12.2% (calculated 12.3%). The reaction product thus has the following structure

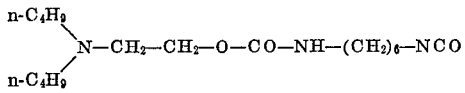

EXAMPLE 3

The reaction mixture prepared in a manner analogous to Example 1 from about 840 g. (5 mol) of N-methyl-piperazine is evaporated in a thin layer evaporator at a heating temperature of about 150° C. and about 0.2 mm. Hg. On the basis of the analytical data, the low viscosity reaction product is found to have the following constitution:

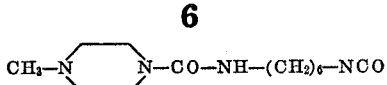

The yield is practically quantitative.

EXAMPLE 4

The reaction mixture prepared in a manner analogous to Example 1 from about 1680 g. (10 mol) of hexamethylene diisocyanate-(1,6) and about 102 g. (1 mol) of N,N-dimethyl-1,3-diaminopropane is subjected to thin layer distillation at about 125° C./0.2 mm. Hg. A pale yellow, thinly liquid reaction product is obtained which according to its amino equivalent has a molecular weight of about 426 (calculated 438) and the following structure:

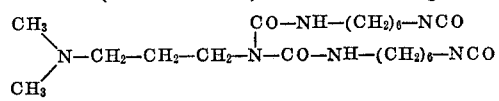

EXAMPLE 5

The reaction mixture obtained according to Example 1 from about 1680 g. (10 mol) of hexamethylene diisocyanate-(1,6) and about 119 g. (1 mol) of N-methyl-di(2-hydroxyethyl)-amine is freed from excess hexamethylene diisocyanate-(1,6) in a thin layer evaporator at about 125° C./0.2 mm. Hg. A pale brown product of low viscosity which has an amino equivalent of about 480 (calculated 450) and the following structure

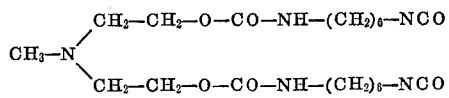

is obtained in practically quantitative yield.

EXAMPLE 6

About 191 g. (1 mol) of molten tri-(2-hydroxypropyl)-amine are added dropwise at such a rate to about 1680 g. (10 mol) of hexamethylene diisocyanate-(1,6) heated to about 90° C. that the temperature is maintained at about 90° C. After the reaction mixture has been stirred for a further 4 hours at about 90° C., it is freed from excess hexamethylene diisocyanate by means of a thin layer evaporator at about 140° C./0.2 mm. Hg. The pale yellow product of moderately high viscosity has an amine equivalent of about 740 (calculated 695) and an isocyanate content of about 17.7% (calculated 18.1%). The yield of triisocyanate is practically quantitative. It has the following structure:

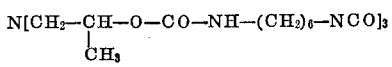

It is to be understood that the foregoing working examples are given for the purpose of illustration and that any other suitable organic isocyanate, amine or the like can be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of a nonvolatile, low molecular weight organic isocyanate containing tertiary amino groups which comprises, reacting, at a temperature of from about 20° C. to about 120° C., a tertiary aliphatic amine which contains one to four hydroxyl groups, one or more secondary amino groups or one to three primary amino groups said tertiary aliphatic amine selected from the group consisting of N,N-dimethylaminoethanol-(2), N,N-diethylaminoethanol-(2), N,N-di-n-butylaminoethanol-(2), N-methyl-di-(2-hydroxyethylamine), N-ethyl-di-(2-hydroxyethylamine), tri-(2-hydroxyethyl)-amine,
N,N-dimethylaminopropanol-(2),
N,N-diethylaminopropanol-(2),
N-methyl-di-(2-hydroxypropyl)-amine,
tri-(2-hydroxypropyl)-amine,
N,N,N',N'-tetra-(2-hydroxypropyl)-ethylene diamine,
N,N,N',N'-tetra-(2-hydroxypropyl)-hexamethylene-
diamine,
N,N-dimethyl-1,3-diaminopropane,
N,N-diethyl-1,3-diaminopropane, and N-methyl-di-(3-aminopropyl)-amine with an excess of a $C_4$ to $C_{10}$ alkylene, $C_4$ to $C_6$ cycloalkane or xylylene diisocyanate, at least three mols of diisocyanate being used for each mol of hydrogen that is reactive with an —NCO group and substantially removing the excess diisocyanate under diminished pressure by means of continuous flow distillation or thin layer distillation at temperatures of about 80 to about 200° C.

2. The process of claim 1 wherein said diisocyanate is hexamethylene diisocyanate.

3. The process of claim 1 wherein the excess diisocyanate is removed at a temperature of about 100 to about 160° C.

4. The process of claim 1 wherein the reaction of said tertiary amine contains 1 to 4 hydroxyl groups.

5. The process of claim 1 wherein the pressure is in the range of about 0.05 to 50 mm. Hg.

References Cited
UNITED STATES PATENTS

| | | | |
|---|---|---|---|
| 2,878,279 | 3/1959 | Schmid et al. | 260—482 |
| 2,969,386 | 1/1961 | McElroy | 260—482 X |
| 3,040,002 | 6/1962 | Aldridge | 260—453 X |
| 3,076,770 | 2/1963 | Saunders et al. | 260—453 X |
| 3,359,295 | 12/1967 | Shultz et al. | 260—453 |
| 3,410,888 | 11/1968 | Hammond | 260—453 |
| 3,415,790 | 12/1968 | Davis et al. | 260—453 X |
| 3,441,588 | 4/1969 | Wagner et al. | 260—453 |
| 3,358,010 | 12/1967 | Britain | 260—453 |

CHARLES B. PARKER, Primary Examiner

D. H. TORRENCE, Assistant Examiner

U.S. Cl. X.R.

260—2.5 AC, 2.5 AT, 247.2 B, 268 C, 453 A, 453 AL, 453 AR, 453 P, 468 C, 471 A, 471 C, 482 C